United States Patent [19]
Woods

[11] Patent Number: 5,690,059
[45] Date of Patent: Nov. 25, 1997

[54] TRAINING COLLAR

[76] Inventor: Jeff Woods, 2523 Wexford Bayne Rd., Franklin Park, Sewickley, Pa. 15143

[21] Appl. No.: 632,844

[22] Filed: Apr. 16, 1996

[51] Int. Cl.$^6$ ................................................ A01K 1/06
[52] U.S. Cl. ........................ 119/856; 119/792; 119/863
[58] Field of Search .............................. 119/856, 863, 119/864, 792, 815, 905

[56] References Cited

U.S. PATENT DOCUMENTS

| | | |
|---|---|---|
| 124,547 | 3/1872 | Cole ........................................ 119/815 |
| 1,163,090 | 12/1915 | Johnson ................................. 119/815 |
| 1,456,706 | 5/1923 | Murray ............................... 119/856 X |
| 1,558,887 | 10/1925 | Jackson ................................. 119/815 |
| 1,614,083 | 1/1927 | Plantico . |
| 1,800,421 | 4/1931 | Wickersham et al. . |
| 2,187,021 | 1/1940 | Everson . |
| 2,605,744 | 8/1952 | Urbanski . |
| 3,974,800 | 8/1976 | Halperin ................................ 119/793 |
| 4,022,161 | 5/1977 | Halperin ................................ 119/793 |
| 4,530,309 | 7/1985 | Collins .................................. 119/863 |
| 4,676,198 | 6/1987 | Murray ............................... 119/856 X |
| 5,531,187 | 7/1996 | Ward ..................................... 119/856 |

*Primary Examiner*—Gene Mancene
*Assistant Examiner*—Yvonne R. Abbott
*Attorney, Agent, or Firm*—Carol I. Bordas

[57] ABSTRACT

A device for training an animal having a first collar, a second collar, spacer members, a mechanism for simultaneously changing the perimeter of at least one of the first and second collars, and a mechanism for limiting the changing of at least one of the perimeters of the first and second collars to a maximum perimeter and a minimum perimeter such that when either or both of the collars are increased to their respective maximum perimeter the animal is prevented from getting free from the training device and when the collars are reduced to their respective minimum perimeter the animal will not be harmed.

17 Claims, 3 Drawing Sheets

TRAINING COLLAR

BACKGROUND OF THE INVENTION

1. Field of the Invention

This invention relates to a training collar for animals. More particularly, this invention concerns a training collar having a first loop defining a first perimeter, a second loop defining a second perimeter, spacer members connecting the first loop to the second loop, means for changing the length of at least one of the perimeters of the first and second loops such that a constant pressure is applied around the neck of the animal, and means for limiting the changing of the length of the at least one of the first and second perimeters to a maximum length and a minimum length wherein the maximum length and the minimum length are size and proportioned to prevent the animal from getting free from the collar and from being harmed, respectively.

2. Description of the Related Art

Harnesses are well known for controlling unruly animals. One type of conventional harness comprises a single elongated strap oriented in a figure eight defining two loops that are connected by a martingale. One of the loops extends around the neck of the animal while the other loop extends around the body of the animal. A leash can be attached to this type of harness. If one of the loops is enlarged a certain amount, this will result in the other loop being reduced inversely proportional to the amount that the loop was enlarged. Examples of this type of device are disclosed in U.S. Pat. Nos. 1,614,083, 1,800,421, and 2,605,744 issued to Plantico, Wickersham et al. and Urbanski, respectively. The disadvantage of using this type of device is that there is no way to regulate the maximum and minimum lengths of the perimeters of each of the loops. If either of the loop perimeters is able to become larger than the animal's neck and/or body, the animal may be able to escape from the harness. Conversely, if either of the loop perimeters has no limit to how small it can become, the loops may strangle the animal. Also, the harness is not an effective training device because the harness does not sit high enough on the neck of the animal to convey clear directions from the trainer to the animal.

Another conventional device is a collar employing a choke chain. This type of collar may comprise one loop that has a definite length, a second loop in the form of a choke chain, and bracing elements that connect the two loops. The choke chain is a single chain having a first end, a second end and a ring attached to the second end. The first end passes through the ring such that the chain forms a tightenable second loop. As the first end is pulled, the second loop contracts around the animal's neck causing discomfort. There is no limit to how small the second loop can become when the first end is pulled. Examples of this type of training device are disclosed in U.S. Pat. Nos. 3,974,800 and 4,022,161 both issued to Halperin. The disadvantage of this type of device is that the animal may be harmed because there is no limit to how small the second loop of the choke chain can become when the first end is pulled. Further, this type of collar is not an effective training device because when the first end of the chain is pulled in the direction that the trainer desires the animal to proceed, the animal's neck is quickly jerked in that direction. After several pulls on the choke chain, the animal will associate the sound of the chain being pulled with the jerking of the animal's neck and will anticipate the pressure around the animal's neck when the animal hears the rattling of the chain. This type of training leads to the animal becoming resistant to following directions. Also, this type of collar does not allow the trainer to get the animal's attention in a class situation where the animal may be distracted by other animals participating in the class.

No where in the above-mentioned related art is there disclosed or suggested a training collar for animals having two loops that applies constant yet, gentle pressure around the neck of an animal by reducing the perimeters of at least one of the two loops extending around the animal's neck and which includes means for limiting the minimum and maximum lengths of the perimeters of the loops such that the animal is not harmed and is prevented from escaping from the training collar. Therefore, there is a definite need for an effective training collar that will control and direct the animal by gently applying pressure around the neck of the animal without harming the animal and preventing the animal from getting free from the collar.

SUMMARY OF THE INVENTION

Accordingly, the present preferred invention provides a training collar which enables the trainer to convey clear directions and control an animal in a manner conducive to effective training without harming the animal.

The present preferred embodiment provides a training collar substantially comprising a first loop defining a first perimeter, a second loop defining a second perimeter, spacer members connecting the first loop to the second loop, means for changing the length of the perimeter of at least one of the first and second loops, and means for limiting the changing of the length of the perimeter of the at least one of the first and second loops to a maximum length and minimum length such that the loop is sized and proportioned to prevent the animal from getting free from the training collar when the at least one of the first and second loops is increased to its respective maximum perimeter length and prevent the animal from being harmed when the at least one of the first and second loops is reduced to its respective minimum perimeter length.

The present preferred invention further provides for adjustment of the maximum and minimum perimeter lengths by providing a buckle on each of the first and second loops.

Preferably, the loops are formed of nylon elongated members and the spacer members are epoxy resin, rod members covered with a nylon material.

The present preferred invention further provides a handle and a connector for a leash such that the training collar can be used alone or with a leash.

The present preferred invention further provides another embodiment having multiple connectors for attaching a leash thereto. The force from the trainer pulling on the leash will be transferred to different areas of the training collar, depending on which connector the leash is attached thereto. For instance, if the leash is attached to a connector positioned on one of the loops, the force from the trainer will change the length of the perimeter of that loop. If the leash is attached to another connector located on a spacer, the force from the trainer will be dispersed into both loops.

The present preferred invention further provides for a training collar that is positioned around the neck of the animal such that the trainer will convey clear directions, and be able to control the animal.

Other details, objects and advantages of the present preferred embodiments will become more apparent with the following description of the present invention.

BRIEF DESCRIPTION OF THE DRAWINGS

The accompanying drawings show the present preferred embodiments of the invention in which.

DETAILED DESCRIPTION OF THE PRESENT PREFERRED INVENTION

Although this invention is suitable for other uses, it will be described as being used in a collar for training dogs. Such description is for the purpose of explanation and is not intended to limit the scope of this invention.

Figure 1:
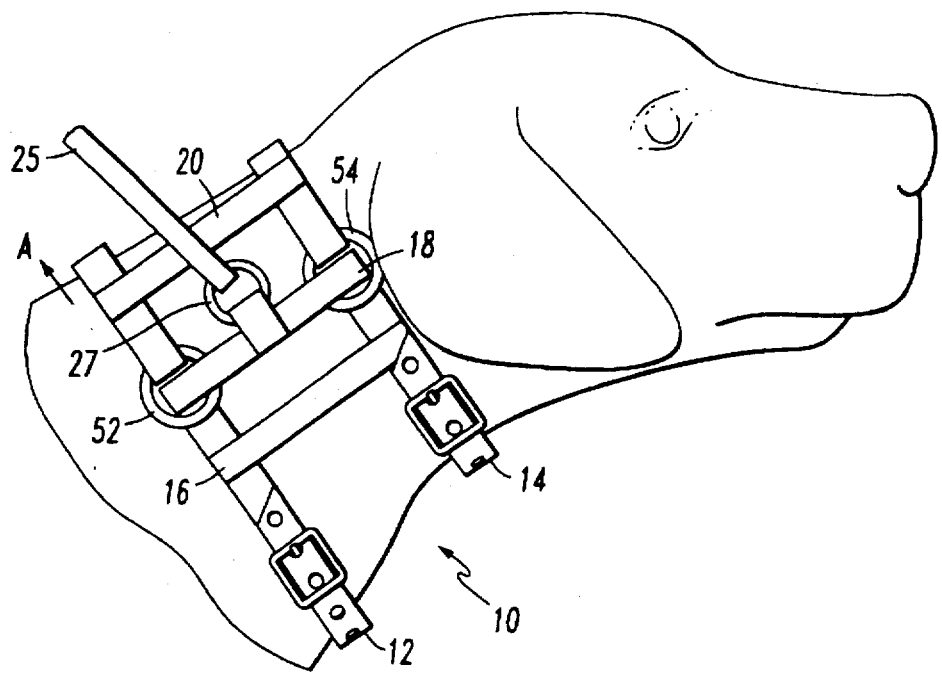
FIG. 1 is a side view of a training collar employing the present preferred invention positioned around the neck of a dog.
Figure 2:
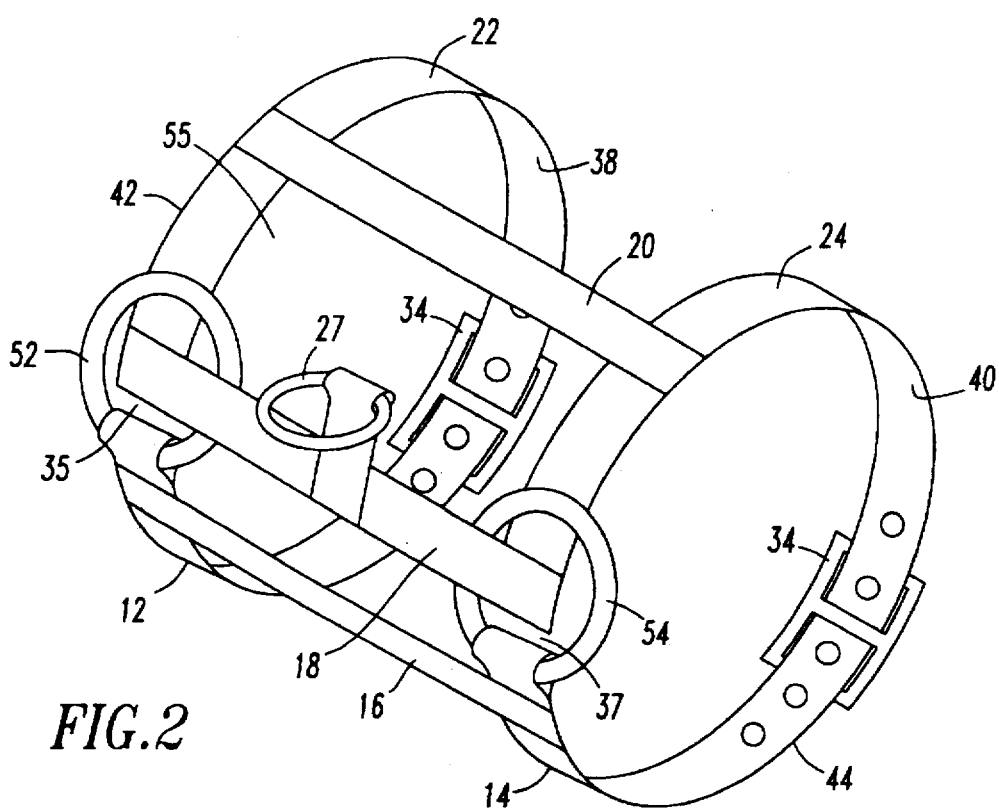
FIG. 2 is a perspective view of the training collar of FIG. 1 where the first and second loops are positioned at their respective maximum perimeters.
Figure 3:
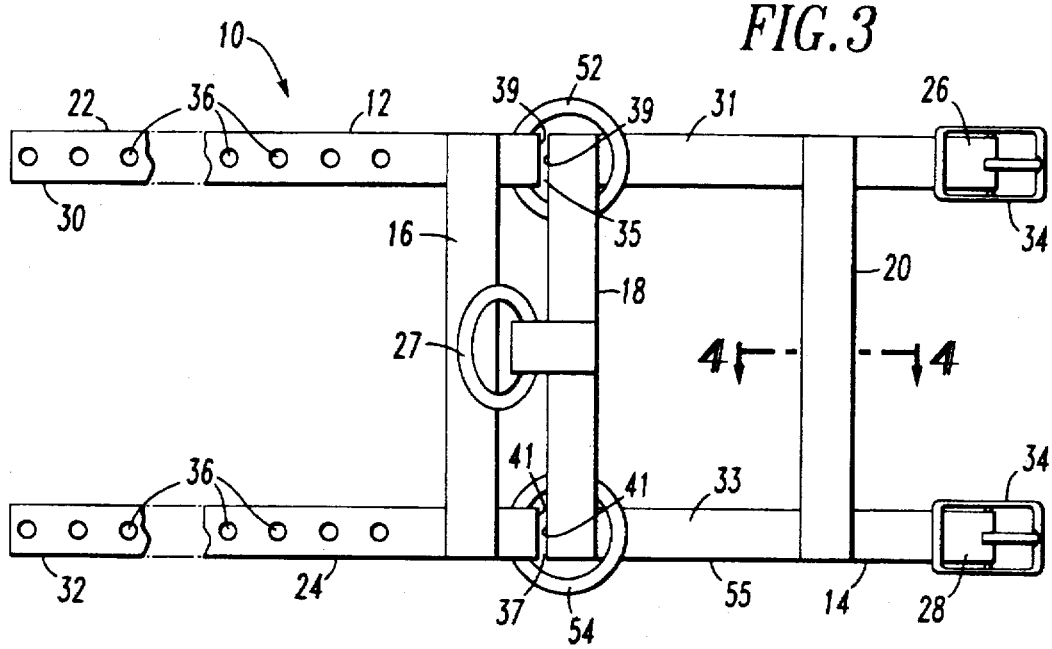
FIG. 3 is a top view of the training collar of FIG. 1 wherein the buckles are unbuckled and the collar is lying flat.
Figure 4:
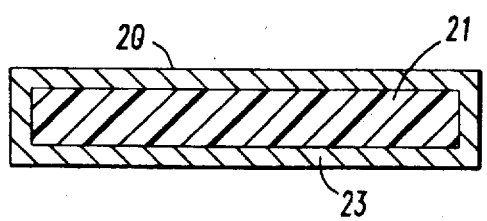
FIG. 4 is a cross-sectional view of the spacer member of the training collar shown in FIG. 3 taken along line 4—4.

FIG. 1 illustrates a present preferred embodiment of the training collar 10 being worn by a dog. Referring to FIGS. 1 through 5, the training collar 10 substantially comprises a first collar 12, a second collar 14 and a plurality of spacer members 16, 18 and 20 attaching the first collar 12 to the second collar 14 at a distance to one another. As best seen in FIG. 4, the spacer members 16, 18 and 20 each preferably comprises an epoxy resin rod 21 surrounded by a nylon material 23. Means for attaching a leash 25 to the training collar 10 in the form of a metal ring 27 is positioned on the spacer 18.

The first collar 12 and the second collar 14 are preferably nylon, elongated members 22 and 24, respectively. Each elongated member 22 and 24 has a first end 26 and 28, a second end 30 and 32, and an intermediate portion at 31 and 33, respectively. Each of the elongated members 22 and 24, have a pair of intermediate edges 39 and 41 which define gaps 35 and 37, respectively. Buckles 34 are attached to each of the elongated members 22 and 24 at their first ends 26 and 28. A plurality of holes 36 are provided in each of the elongated members 22 and 24 at their second ends 30 and 32.

One of the metal rings 52 and 54 is attached to each of the elongated members 22 and 24 at one of the pair of the intermediate edges 39 and 41, respectively. Preferably, the metal rings 52 and 54 are attached at one of the pair of the intermediate edges 39 and 41 by being threaded through holes 29 defined by the elongated members 22 and 24, respectively. The metal rings 52 and 54 span the gaps 35 and 37, respectively, and are each linked to a rectangular section 55 of the collar 10. The sides of the rectangular section 55 are the spacer members 18 and 20 and the intermediate portions 31 and 33 of the elongated members 22 and 24.

In operation, the collar 10 is placed around the dog's neck and the second ends 30 and 32 are threaded through the buckles 34 such that the elongated members 22 and 24 each define a first loop 38 and a second loop 40. Each of the first and second loops 38 and 40 has a perimeter 42 and 44. The maximum perimeter of each of the first and second loops 38 and 40 is fixed once the buckles 34 are buckled. However, the lengths of the perimeters 42 and 44 can be adjusted by repositioning the buckles 34 at different holes 36 within the second ends 30 and 32 of the elongated members 22 and 24. For example, the training collar 10 is preferably made in three neck sizes, small, medium, and large, where the small collar has an adjustable neck size of between ten (10) and seventeen (17) inches, the medium collar has an adjustable neck size of between fifteen (15) and twenty-two (22) inches, and the large collar has an adjustable neck size of between eighteen (18) and twenty-six (26) inches. The size of the training collar 10 should be chosen such that the maximum length of each of the perimeters 42 and 44 is sized and proportioned wherein the collar 10 will fit snugly around the dog's neck and will prevent the dog from escaping from the collar 10. Although it is preferred that buckles 34 be used, other means of adjustment can be incorporated into the present invention.

Figure 5:
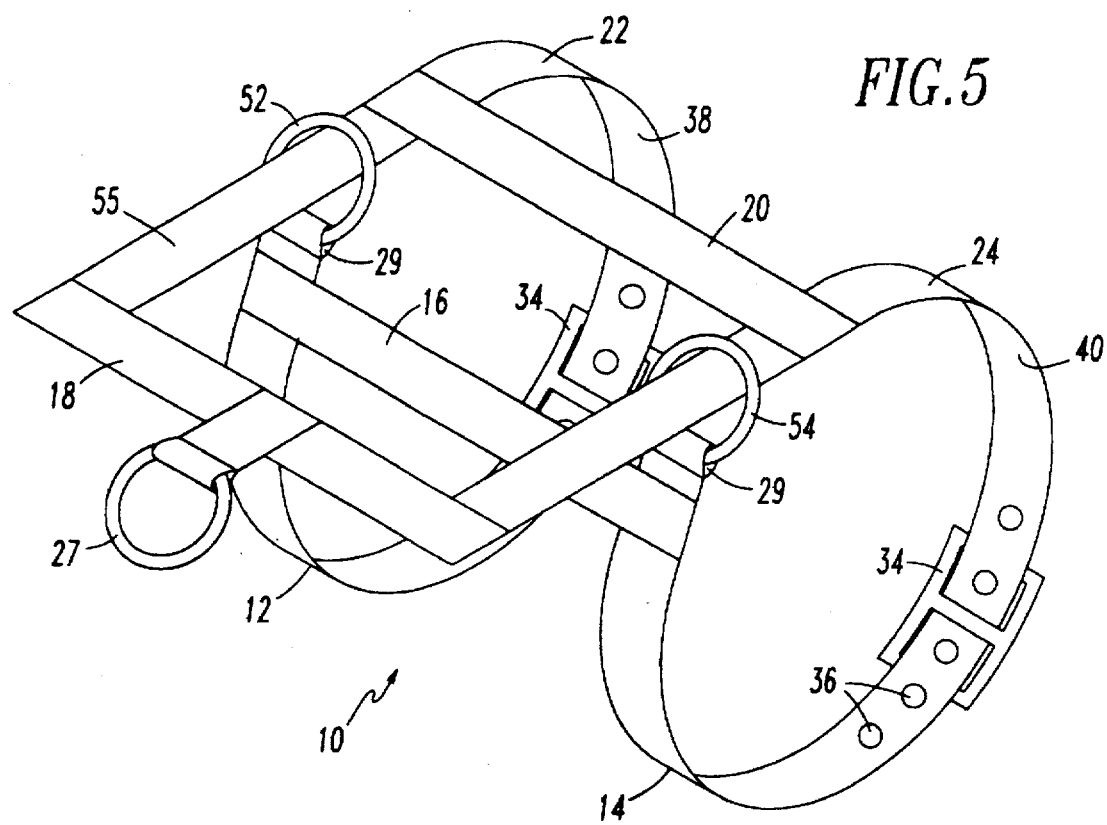
FIG. 5 is a perspective view of the training collar shown in FIG. 1 wherein the first and second loops are substantially positioned at their respective minimum perimeters.

As can be seen in FIG. 1, when the leash 25 is pulled in the direction of arrow A to direct and control the dog, the spacer 18 will be pulled away from the dog's neck such that the intermediate portions at 31 and 33 of the elongated members 22 and 24 will be pulled through the metal rings 52 and 54, respectively, decreasing the perimeters 42 and 44 and applying pressure around the dog's neck. As best seen in FIG. 5, the spacer member 20 blocks the metal rings 52 and 54 from sliding along the entire length of the elongated members 22 and 24, respectively. The spacer members 18 and 20 are spaced from one another along the elongated members 22 and 24 such that the perimeters 42 and 44 are each prevented from being reduced to a minimum length that applies excessive pressure around the animal's neck.

When there is slack in the leash 25, the metal rings 52 and 54 will slide in the direction opposite of arrow A along the intermediate portions at 31 and 33, respectively, and the length of the perimeters 42 and 44 will increase to their respective maximum perimeters. Although metal rings 52 and 54 are used in the present preferred embodiment, other devices can be used that provide for decreasing and increasing the lengths of the perimeters 42 and 44.

Figure 7:
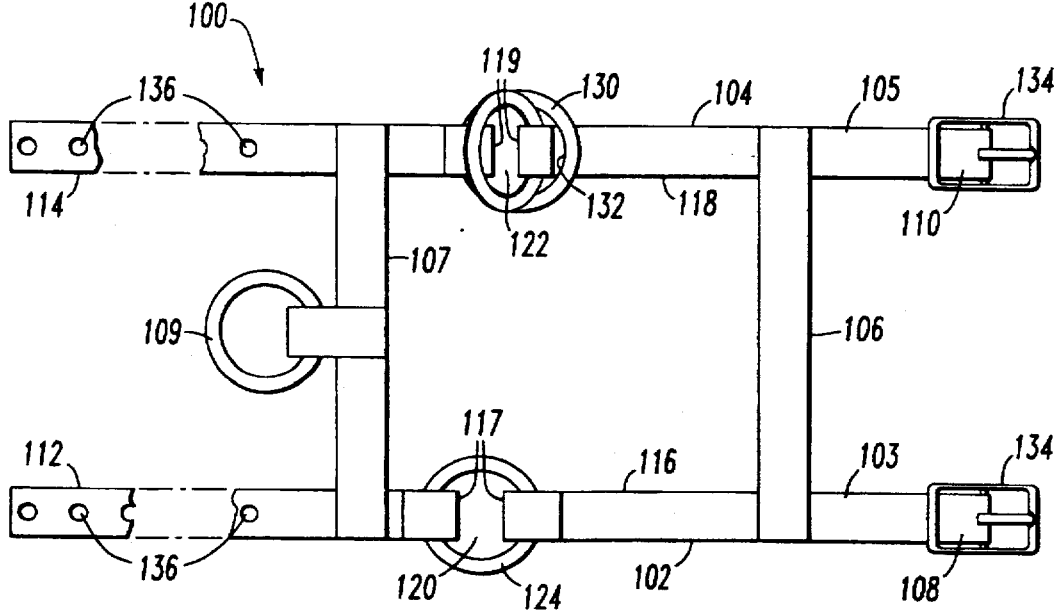
FIG. 7 is a top view of the training collar of FIG. 6 wherein the buckles are unbuckled and the collar is lying flat.
Figure 6:
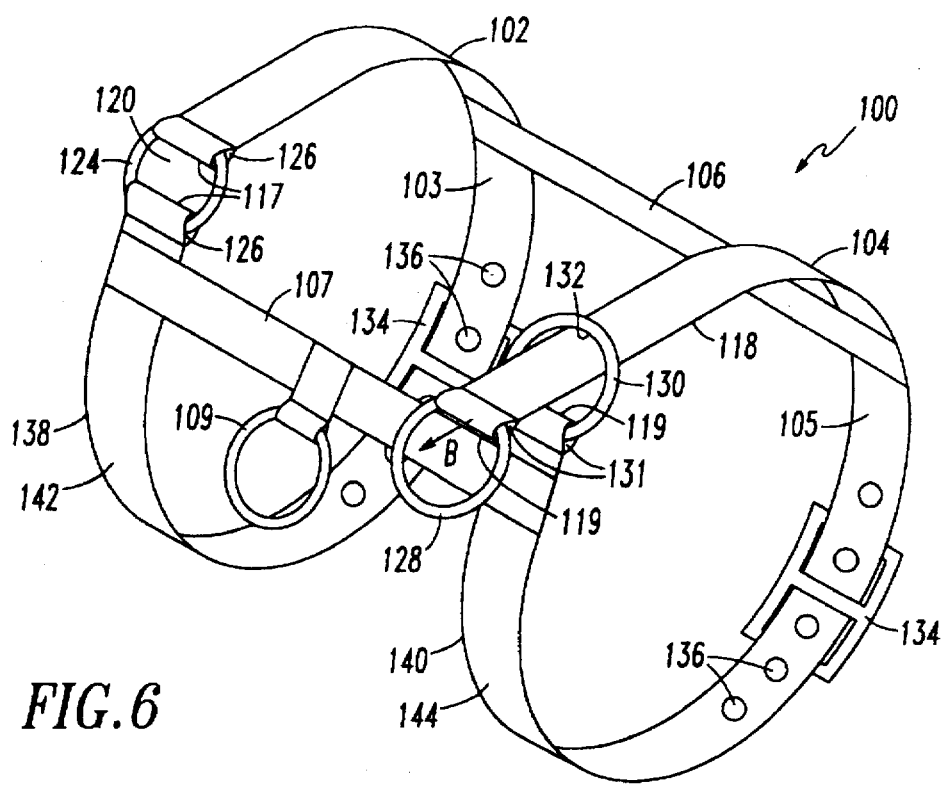
FIG. 6 is a perspective view of another embodiment of the training collar of the present preferred invention.

FIGS. 6 and 7 illustrate another embodiment of the training collar of the present preferred invention. The training collar 100 comprises a first collar 102, a second collar 104 and two spacer members 106 and 107 which are attached to and connect the first and second collars 102 and 104 at a distance from one another. The first and second collars 102 and 104 comprise a first elongated member 103 and a second elongated member 105 each having a first end 108 and 110, a second end 112 and 114, and an intermediate portion at 116 and 118, respectively. Buckles 134 are provided at the first ends 108 and 110 of the elongated members 103 and 105, respectively. A plurality of holes 136 are provided at the second ends 112 and 114 of each of the elongated members 103 and 105. The spacer members 106 and 107 each preferably comprises an epoxy resin rod surrounded by a nylon material, as illustrated in FIG. 4. Means for attaching a leash to the training collar 100 takes the form of a metal ring 109 which is positioned on the spacer 107.

Each of the intermediate portions at 116 and 118 have a pair of edges 117 and 119 which define gaps 120 and 122, respectively. The pair of edges 117 are attached to a metal ring 124. Specifically, the metal ring 124 is threaded through holes 126 defined by the elongated members 103 thus, the metal ring spans the gap 120. Second and third metal rings 128 and 130 are each attached to one of the pair of edges 119 of the intermediate portion 118 by being threaded through holes 131 defined by the elongated member 105. The elongated member 105 is threaded through an opening 132 of the third metal ring 130.

In operation, the training collar 100 is placed around the dog's neck and the second ends 112 and 114 are threaded through the buckles 134 such that the elongated members 103 and 105 define two loops 138 and 140 having a first perimeter 142 and a second perimeters 144, respectively. The maximum perimeter of each of the first and second loops 138 and 140 are fixed once the buckles 134 are buckled. However, the lengths of the perimeters 142 and 144 can be adjusted by repositioning the buckles 134 at various holes 136 in the elongated members 103 and 105, as discussed above. The length of the perimeters 142 and 144 should be chosen such that the first and second loops 138 and 140 fit snugly around the dog's neck and the dog is prevented from escaping from the training collar 100.

A leash (not shown) can be attached to any one of the metal rings 109, 124, 128 and 130. If a leash is connected to the second metal ring 128 and the leash is pulled in the direction of the arrow B, the elongated member 105 will slide through the opening 132 of the third metal ring 130 and the length of the perimeter 144 will decrease in size. The perimeter 144 of the elongated member 105 is prevented from becoming too small and harming the dog, because the third metal ring 130 will be prevented from sliding along the entire length of the elongated member 105 by the spacer member 106.

Alternatively, if a leash is connected to the metal ring 109 positioned on the spacer 107, the spacer 107 will transfer the force placed on the leash to the two collars 102 and 104 in substantially equal amounts. The dog wearing the training collar 100 will realize the pull on the leash along both the first and second loops 138 and 140 positioned around its neck. The perimeters 142 and 144 of the first and second loops will not be changed as a result of the pull on the leash.

Lastly, if a leash is connected to either of the metal rings 124 and 130 and the leash is pulled, the force will be transmitted through the leash to only one of the first and second collars 102 and 104. In the instance where the leash is connected to the metal ring 124, the force will be transmitted to the first collar 102 and will result in the part of the dog's neck which engages the first collar 102 being pulled in the desired direction. However, if the leash is connected to the metal ring 130, the force will be transmitted to the second collar 104 and will result in the part of the dog's neck which engages the second collar being pulled in the desired direction.

While the present preferred embodiments has been described herein, it is distinctively understood that the invention is not limited thereto, but may be otherwise variously embodied within the scope of the following claims and any equivalence thereof.

I claim:

1. An apparatus for training animals comprising:
   (a) a first collar defining a perimeter;
   (b) a second collar defining a perimeter;
   (c) means for spacing the first collar from the second collar at a distance;
   (d) means for simultaneously changing the lengths of the perimeters of the first and second collars such that when the perimeters of the first and second collars are reduced a constant pressure is applied to the neck of an animal; and
   (e) means for limiting the changing of the first and second perimeters such that each has a maximum perimeter and a minimum perimeter, wherein when the collars are reduced to their respective minimum perimeters, the animal is prevented from being harmed and when the collars are increased to their respective maximum perimeters, the animal is prevented from escaping from the first and second collars.

2. A collar for training animals comprising:
   (a) a first elongated member having a first end, a second end and an intermediate portion;
   (b) a second elongated member having a first end, a second end and an intermediate portion;
   (c) a plurality of spacers which attach the first elongated member to the second elongated member at a distance;
   (d) means for connecting the first ends of the first and second elongated members to the second ends of the first and second elongated members, respectively, such that each of the first elongated member and the second elongated member forms a loop that defines a perimeter; and
   (e) means for simultaneously changing the lengths of the perimeters of the loops such that when the perimeters are reduced each of the first elongated member and the second elongated member apply a pressure around the neck of an animal.

3. The training collar of claim 2 wherein each of the plurality of spacers is a rigid rod member which is attached to and extends between the first and second elongated members.

4. The training collar of claim 3 wherein the plurality of spacers is three.

5. The training collar of claim 3 further comprising means for attaching a leash to one of the rod members.

6. The training collar of claim 5 wherein each of the intermediate portions of the first and second elongated members have a pair of edges defining a gap.

7. The training collar of claim 6 wherein the means for changing the lengths of the perimeters comprises:
   (a) a first metal ring attached to one edge of the pair of edges of the first elongated member, wherein the first metal ring defines a hole through which the first elongated member extends; and
   (b) a second metal ring attached to one edge of the pair of edges of the second elongated member, wherein the second metal ring defines a hole through which the second elongated member extends, and wherein when the attaching means is pulled in a direction away from the collar, the first and second elongated members will slide through the holes of the first and second metal rings, respectively, such that the first and second perimeters are reduced.

8. The training collar of claim 3 wherein the first and second elongated members are nylon material and the rod members are an epoxy resin covered with nylon material.

9. The training collar of claim 2 wherein the connecting means comprises:
   (a) a buckle positioned on the first end of each of the first elongated member and the second elongated member; and
   (b) a plurality of holes located at the second ends of each of the first elongated member and the second elongated member.

10. The training collar of claim 2 further comprising:
    (a) means for limiting the changing of the perimeters of the loops such that each has a maximum perimeter and a minimum perimeter, and wherein when the loops are reduced to their respective minimum perimeters, the animal is prevented from being harmed and when the loops are increased to their respective maximum perimeters, the animal is prevented from escaping from the training collar.

11. The training collar of claim 10 wherein the means for limiting the changing of the perimeters of the loops comprises the plurality of spacers being proportionally spaced from one another such that the first and second metal rings are prevented from sliding along the entire length of the first and second elongated members, respectively, and forming a minimum perimeter that will harm the animal and a maximum perimeter that will allow the animal to escape from the collar.

12. An apparatus for training animals comprising:
   (a) a first collar defining a perimeter wherein the first collar is an elongated member with a first end, a second end and an intermediate portion;
   (b) a second collar defining a perimeter wherein the second collar is a second elongated member with a first end, a second end and an intermediate portion;
   (c) means for spacing the first collar from the second collar at a distance to one another;
   (d) means for changing the perimeter of at least one of the first and second collars such that when the perimeter of the at least one of the first and second collars are reduced, a constant pressure is applied to the neck of the animal;
   (e) means for limiting the changing the perimeter of the at least one of the first and second collars such that a maximum perimeter and a minimum perimeter are defined, wherein when the at least one of the first and second collars are reduced to their respective minimum perimeter, the animal is prevented from being harmed and when the at least one of the first and second collars are increased to their respective maximum perimeter, the animal is prevented from escaping from the training apparatus; and
   (f) means for connecting the first ends of the first and second elongated members to the second ends of the first and second elongated members, respectively, such that the first elongated member and the second elongated member form a loop that defines the first and second perimeters, respectively.

13. The apparatus for training animals of claim 12 wherein the spacing means comprises two rod members attached to and extending between the first collar and the second collar.

14. An apparatus for training animals comprising:
   (a) a first collar defining a perimeter wherein the first collar is an elongated member with a first end, a second end and an intermediate portion;
   (b) a second collar defining a perimeter wherein the second collar is a second elongated member with a first end, a second end and an intermediate portion;
   (c) means for spacing the first collar from the second collar at a distance to one another;
   (d) means for changing the perimeter of at least one of the first and second collars such that when the perimeter of the at least one of the first and second collars are reduced, a constant pressure is applied to the neck of the animal;
   (e) means for limiting the changing the perimeter of the at least one of the first and second collars such that a maximum perimeter and a minimum perimeter are defined, wherein when the at least one of the first and second collars are reduced to their respective minimum perimeter, the animal is prevented from being harmed and when the at least one of the first and second collars are increased to their respective maximum perimeter, the animal is prevented from escaping from the training apparatus, and wherein each of the intermediate portions of the first and second elongated members each have a pair of edges which each define a gap.

15. The apparatus for training animals of claim 14 wherein the means for changing the perimeter of the at least one of the first and second collars comprises:
   (a) a first metal ring attached to one edge of the pair of edges of the first elongated member, and
   (b) a second metal ring attached to the other edge of the pair of edges of the first elongated member, wherein the first elongated member extends through the hole of the first metal ring.

16. The apparatus for training animals of claim 15 wherein the limiting means further comprises the two rod members being proportionally spaced from one another such that the first and second metal rings are prevented from sliding along the first elongated member and forming a minimum perimeter that will harm the animal and a maximum perimeter that will allow the animal to escape from the training apparatus.

17. The apparatus for training animals of claim 16 further comprising a third metal ring attached to both edges of the pair of edges of the second elongated member.

* * * * *